(12) United States Patent
Lee et al.

(10) Patent No.: US 7,870,679 B2
(45) Date of Patent: Jan. 18, 2011

(54) TAPE MEASURES

(75) Inventors: Barry Howard Lee, Rayleigh (GB); Mike Elam, London (GB); Michael John Levick, Southend-On-Sea (GB)

(73) Assignee: Fisco Tools Limited, Rayleigh, Essex (GB)

( * ) Notice: Subject to any disclaimer, the term of this patent is extended or adjusted under 35 U.S.C. 154(b) by 99 days.

(21) Appl. No.: 12/087,527

(22) PCT Filed: Jan. 9, 2007

(86) PCT No.: PCT/GB2007/000046
§ 371 (c)(1),
(2), (4) Date: Dec. 3, 2008

(87) PCT Pub. No.: WO2007/080390
PCT Pub. Date: Jul. 19, 2007

(65) Prior Publication Data
US 2009/0300931 A1  Dec. 10, 2009

(30) Foreign Application Priority Data

Jan. 9, 2006 (GB) ................................. 0600319.8
Oct. 6, 2006 (GB) ................................. 0619811.3

(51) Int. Cl.
*G01B 3/10* (2006.01)
(52) U.S. Cl. .............................. 33/770; 33/755; 33/758; 33/761

(58) Field of Classification Search ................... 33/770, 33/755, 756, 758, 760, 761, 768, 1 H, 1 G, 33/668
See application file for complete search history.

(56) References Cited

U.S. PATENT DOCUMENTS

| | | | | |
|---|---|---|---|---|
| 3,045,788 A * | 7/1962 | Cederholm | ................... | 52/155 |
| 3,289,306 A * | 12/1966 | Todd | ........................... | 33/760 |
| 3,347,487 A | 10/1967 | Sellen et al. | | |
| 4,542,589 A * | 9/1985 | Yamamoto | ..................... | 33/760 |
| 4,700,489 A * | 10/1987 | Vasile | .......................... | 33/342 |
| 5,134,784 A * | 8/1992 | Atienza | ....................... | 33/668 |
| 5,379,524 A * | 1/1995 | Dawson | ....................... | 33/768 |
| 5,671,543 A * | 9/1997 | Sears | ........................... | 33/668 |
| 6,115,931 A | 9/2000 | Arcand | | |
| 6,513,261 B2 * | 2/2003 | Johnson | ....................... | 33/668 |
| 7,434,330 B2 * | 10/2008 | McEwan et al. | ............... | 33/770 |
| 7,500,322 B2 * | 3/2009 | Brown | .......................... | 33/668 |
| 7,568,296 B2 * | 8/2009 | Huang | .......................... | 33/761 |

FOREIGN PATENT DOCUMENTS

| CN | 2701650 Y | 5/2005 |
|---|---|---|
| CN | 2720399 Y | 8/2005 |

* cited by examiner

*Primary Examiner*—Christopher W Fulton
(74) *Attorney, Agent, or Firm*—Buchanan, Ingersoll & Rooney, PC

(57) ABSTRACT

A tape measure having a support structure and an elongate spike mountable on the support structure. The elongate spike is moveable relative to the support structure for mounting in any selected one of two or more positions relative to the support structure. The two positions can include a position can include a position for use and a storage position.

7 Claims, 13 Drawing Sheets

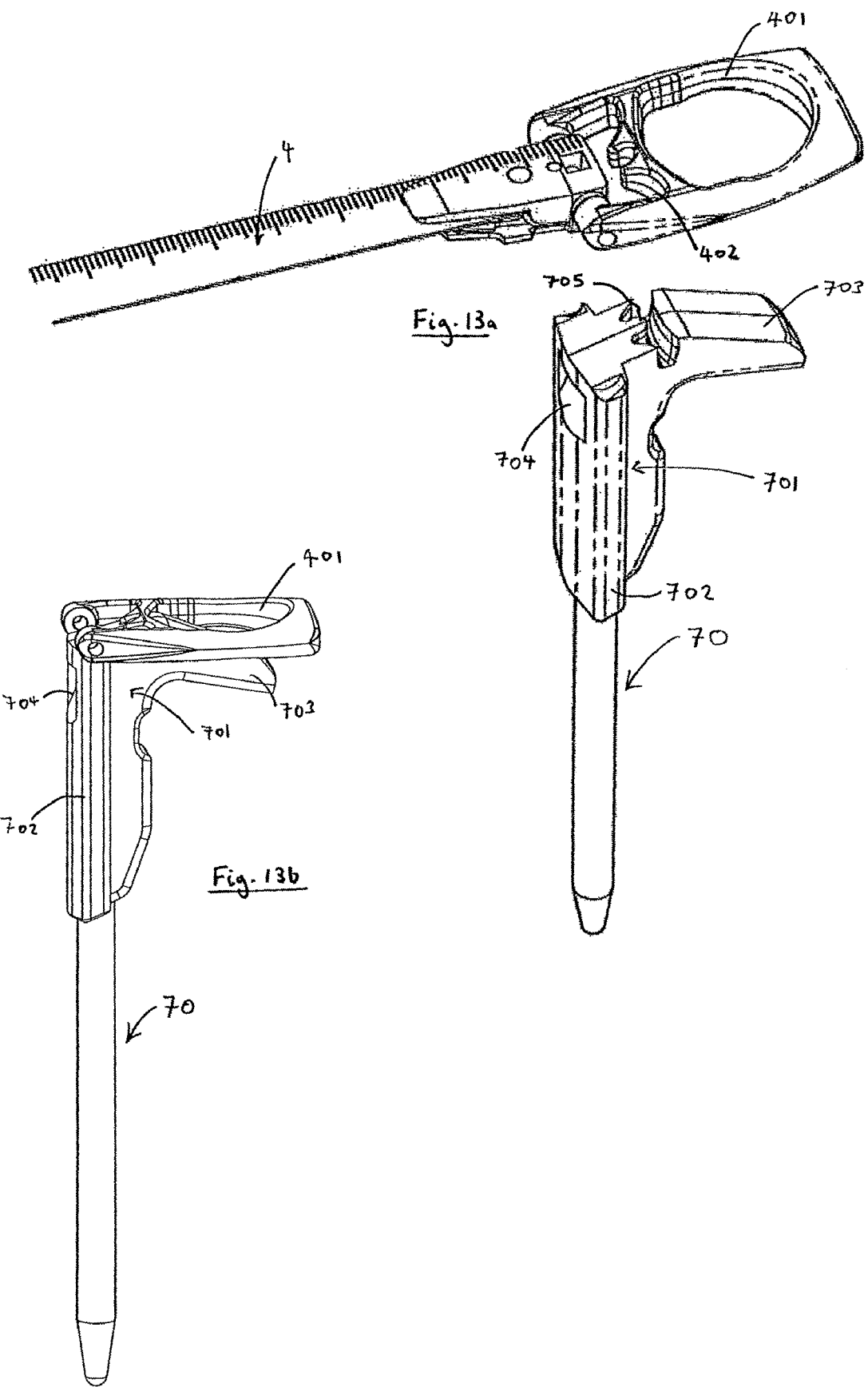

TAPE MEASURES

This application is a National Stage filing under 35 U.S.C. §371 of International Application No. PCT/GB2007/000046, filed on Jan. 9, 2007, now published as WO 2007/080390, which in turn claims priority to British Application Nos. 0600319.8 filed Jan. 9, 2006, and 0619811.3 filed Oct. 6, 2006, the entire contents of which are incorporated herein by reference.

FIELD OF THE INVENTION

The present invention relates to tape measures and is particularly, although not necessarily exclusively, applicable to tape measures of a type known as 'long tapes'.

BACKGROUND

Tape measures for distances of 10 meters or greater (so called 'long tapes') tend to differ from those for shorter distances in that in most cases there is no spring mechanism for returning the tape (generally referred to as a 'blade' in shorter tapes) to a spooled condition. To unwind the 'long' tape, the required length of tape is simply pulled out. A winding handle is generally provided to spool the tape, the tape being rewound by turning this winding handle in the appropriate direction with one hand whilst gripping the tape measure with the other. The tape itself generally has an end piece that includes a hook or loop or can be used in conjunction with a separate hook or peg to fix the tape end to the ground.

One conventional form of 'long tape' measure has a winding drum or spool that is rotatably mounted on a frame. The measuring tape is attached at one end to the drum so that it can be coiled around the drum within the frame. At least one side face of the drum is exposed at an aperture in the frame. A winding handle is mounted on a centre moulding which is attached to (or located in) the exposed part of the side of the winding drum so that it can be used to return the tape to its spooled condition.

The frame generally also includes a handle extending beyond and above the spooled tape, which can be grasped to hold the tape measure as the tape is drawn out or rewound. The frame may also include a protrusion diametrically opposite the handle that tapers to a point that can be pressed against the ground when taking a measurement to help hold the tape taught.

Another conventional form of 'long tape' measure has a case with first and second circular side walls spaced apart from each other with their peripheries connected by an edge wall, so as to define a generally disc shaped enclosure within which the winding drum and the tape spooled on it are housed. The winding drum is supported by the side walls, the axis of the drum passing through the centre of one or both side walls, and a winding handle is attached to the drum at one of the side walls. The tape can be drawn out from the casing through a slot (often provided by a "mouthpiece") in the edge wall of the casing and rewound by turning the winding handle with one hand whilst gripping the casing with the other. The drum may be a one piece moulding with the winding handle attached to it or there may be a separate drum and centre mouldings with the winding handle attached to a centre moulding.

Many 'long tapes' are used by professionals, such as surveyors, estates agents and builders. They are often used to take many measurements in a short period of time. It is important that such tapes are easy to use and enable very accurate measurements to be taken by a single operator. It can be difficult in some circumstances, however, to hold the known tape measures in a fixed position whilst one or more readings are taken. Tape measures of the type referred to above having a tapered protrusion terminating in a point that can be pressed against the ground can help in such circumstances but at other times the protrusion may be a hindrance.

SUMMARY OF THE INVENTION

At its most general, the present invention provides a tape measure having an elongate spike, the elongate spike being moveable relative to a support structure of the tape measure.

By being moveable relative to the support structure, the elongate spike may be moved between a plurality of positions for use and/or between one or more positions for use and one or more storage positions.

The elongate spike may be removable/detachable from a position at which it is mounted to the support structure for use, in order that it can be moved to a remote storage position. Alternatively, the elongate spike may be moveably mounted to the support structure so that it can be moved between one or more positions for use and/or for storage, whilst being supported by, generally, the same part of the support structure.

According to a first aspect, the present invention provides:
a tape measure having a winding drum or reel rotatably mounted on a support structure, a measuring tape attached to the drum so as to be coilable thereon, and an elongate spike mounted on the support structure, the spike being adjustable in position relative to the support structure to protrude to a greater or lesser extent beyond the perimeter of the coiled measuring tape.

In use, the spike can be adjusted to a position in which it rests on the ground, similarly to the known tapered protrusions referred to above. Advantageously, in preferred embodiments, the spike can be extended further allowing it to be embedded into the ground whilst still maintaining a clearance between the ground and the point at which the tape is drawn off the drum as the tape is extended in use. This more surely holds the tape measure in position and may even support the tape measure without the operator having to hold it.

Preferably the spike can be retracted fully within the support structure. This avoids the spike interfering with the taking of measurements when it is not needed.

The spike is preferably adjustable by being displaceable along its longitudinal axis. For instance it may slide in the direction of its longitudinal axis. The support structure preferably includes one or more guides to determine the path of movement of the spike as its position is adjusted, for example one or more slots or grooves extending parallel with the longitudinal axis of the spike.

It is desirable that the spike can be locked in any of a plurality of positions. The spike may be lockable in a plurality of predefined positions or in any position between two extremities of its movement for example. A lock member that fixes the position of the spike relative to the support structure may be provided for this purpose. The lock member may include one or more detent elements, cam elements and/or threaded elements for example.

According to a second aspect, the present invention provides:
a tape measure having a winding drum or reel rotatably mounted on a support structure, a measuring tape attached to the drum so as to be coilable thereon, and an elongate spike for removably mounting on the support structure.

The elongate spike may be removable from its mounting position on the support structure so that it can be stored when not required.

Preferably, the elongate spike is stored on or in the tape measure. The elongate spike may be stored in a housing of the tape measure. Preferably, the elongate spike is stored in a housing comprised in a grip handle of the tape measure.

The tape measure of the second aspect of the present invention may also be a tape measure according to the first aspect of the present invention and/or include any of the preferable features thereof. Thus, the elongate spike may be removably mounted on the support structure whereupon its position is adjustable relative to the support structure to protrude to a greater or lesser extent beyond the perimeter of the coiled measuring tape.

The support structure of the first and/or second aspect may be a frame or a casing. The tape measure is preferably a long tape and includes one or more winding handles for retracting the tape.

According to a third aspect, the present invention provides an elongate spike for use in the second aspect of the invention.

According to a fourth aspect, the present invention provides an elongate spike for coupling to the free end of a measuring tape of a tape measure.

The elongate spike may be used to fix the free end of the measuring tape to the ground.

Preferably, when coupled to the free end of the measuring tape, the longitudinal axis of the elongate spike aligns with the "zero position" of the measuring tape (i.e. the position from which the distance scale(s) of the tape measure 10 are measured).

Embodiments of the present invention will now be described by way of example only with reference to the accompanying drawings, in which:—

Figure 9A:
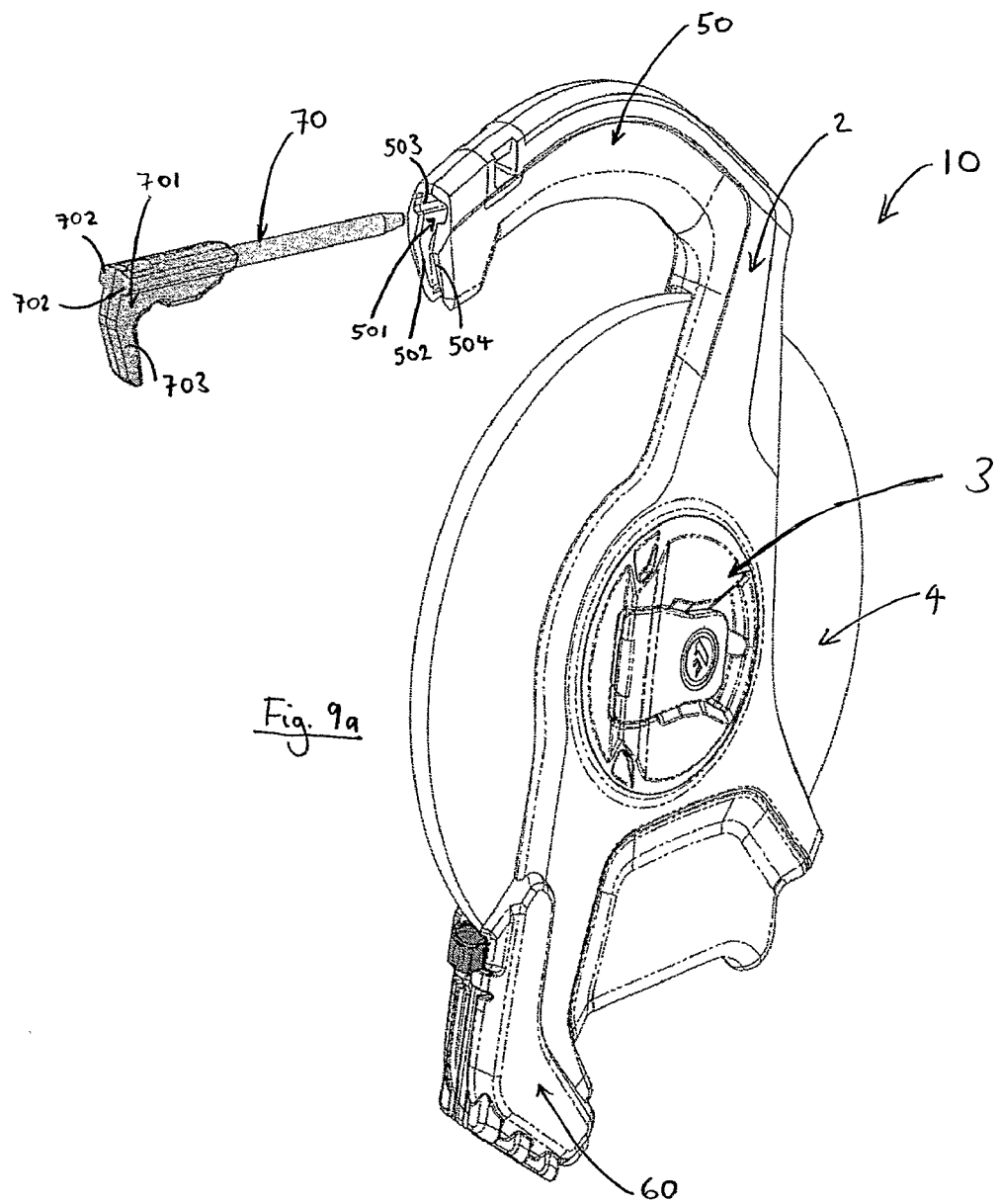
FIGS. 9a and 9b are oblique views of a tape measure in accordance with a second embodiment of the present invention that illustrate how a ground engaging spike, described below, is stored.
Figure 9B:
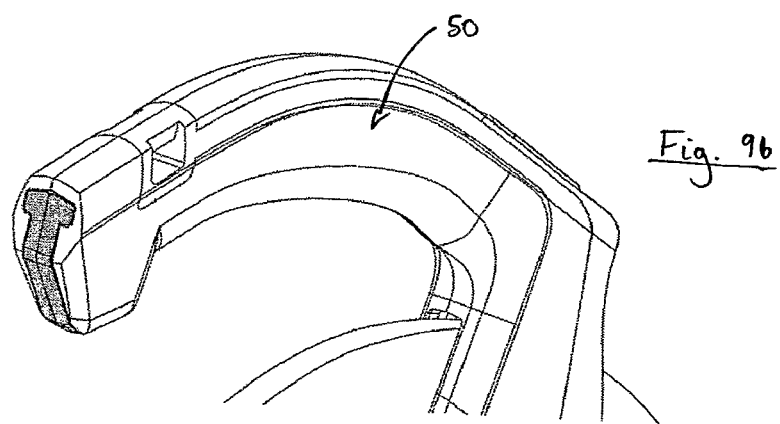
Figure 10A:
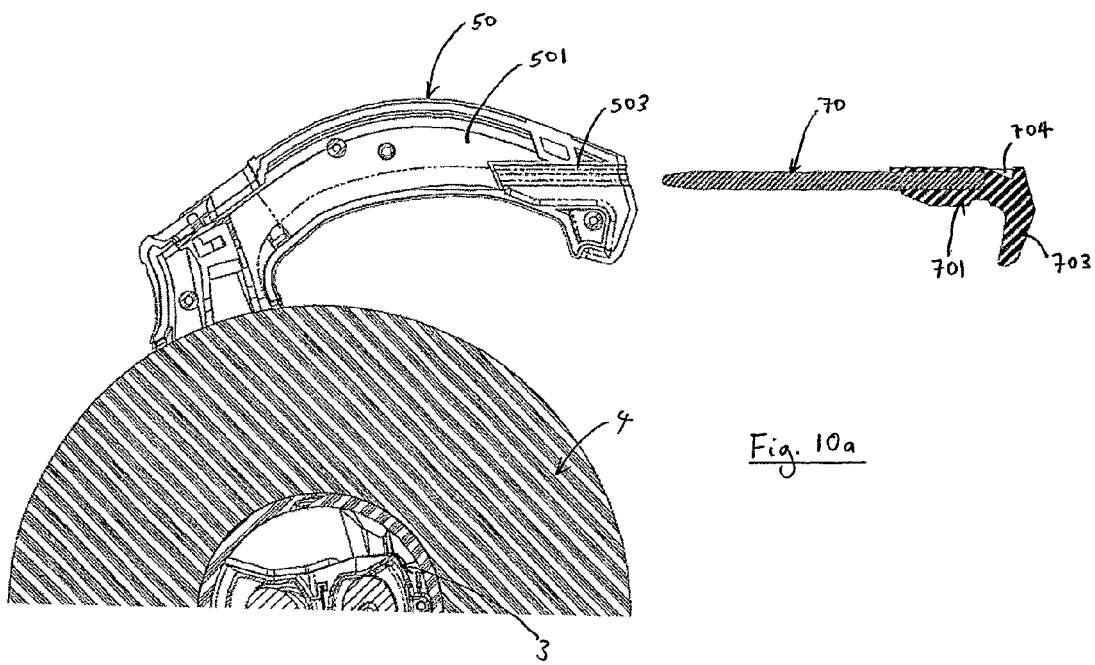
Figure 10B:
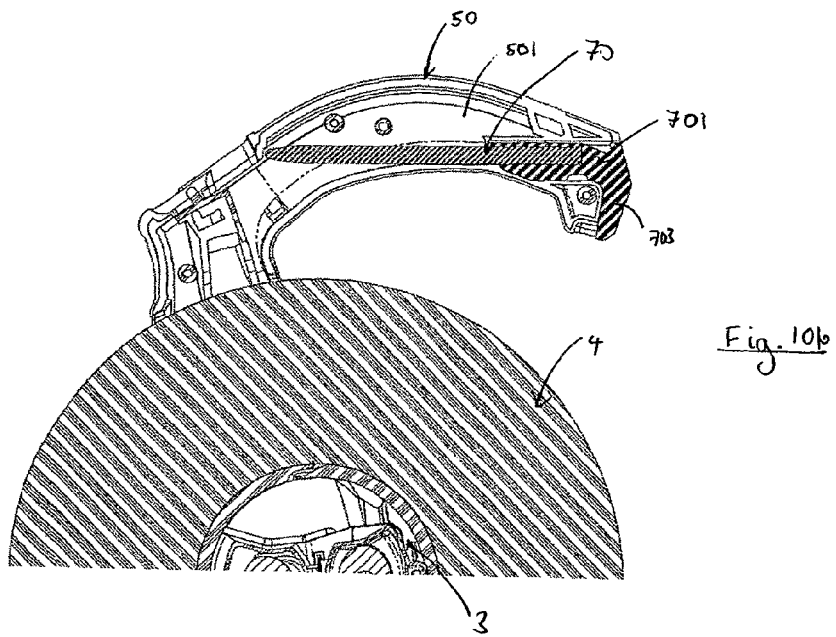
Figures 11A, 11B:
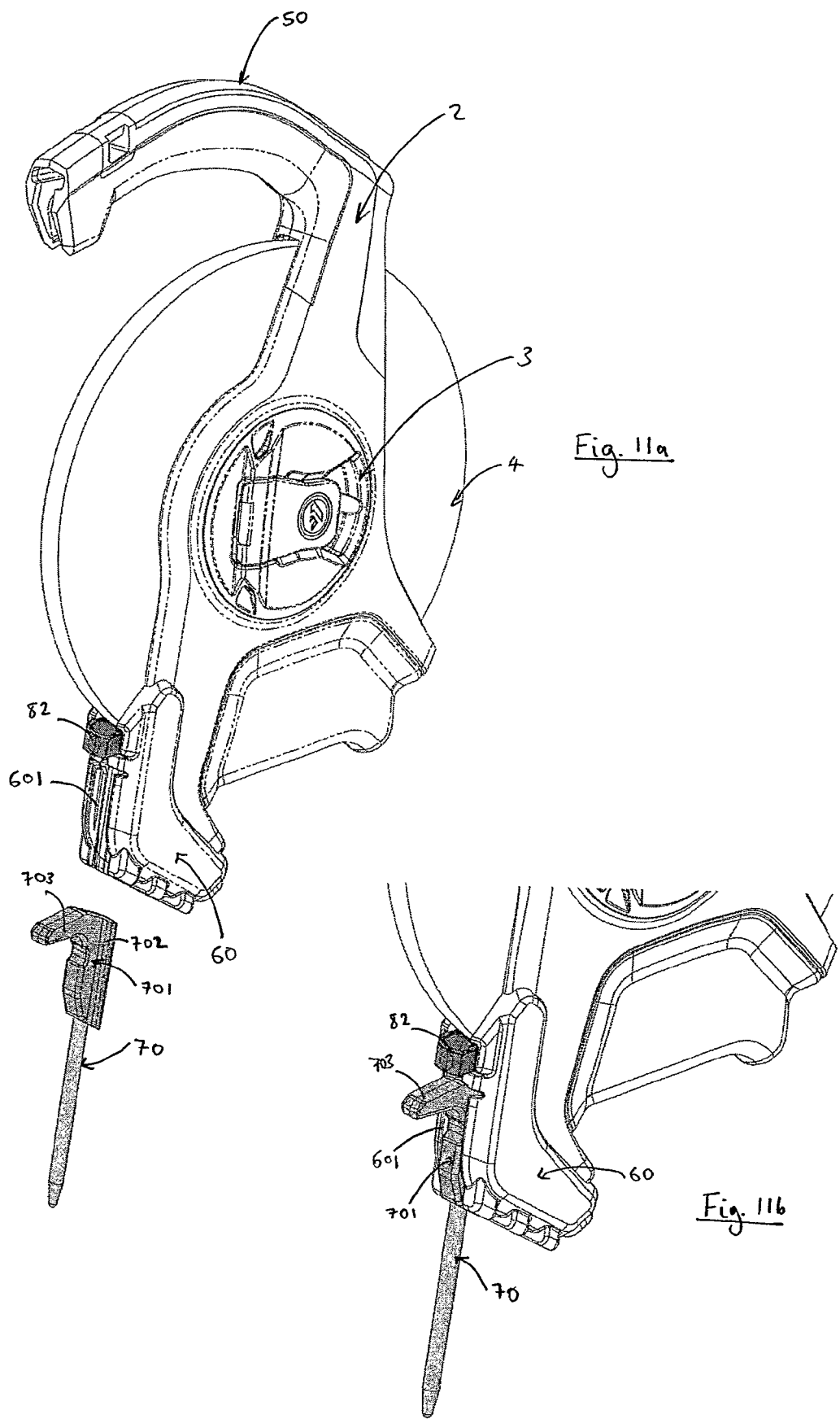
Figure 12A:
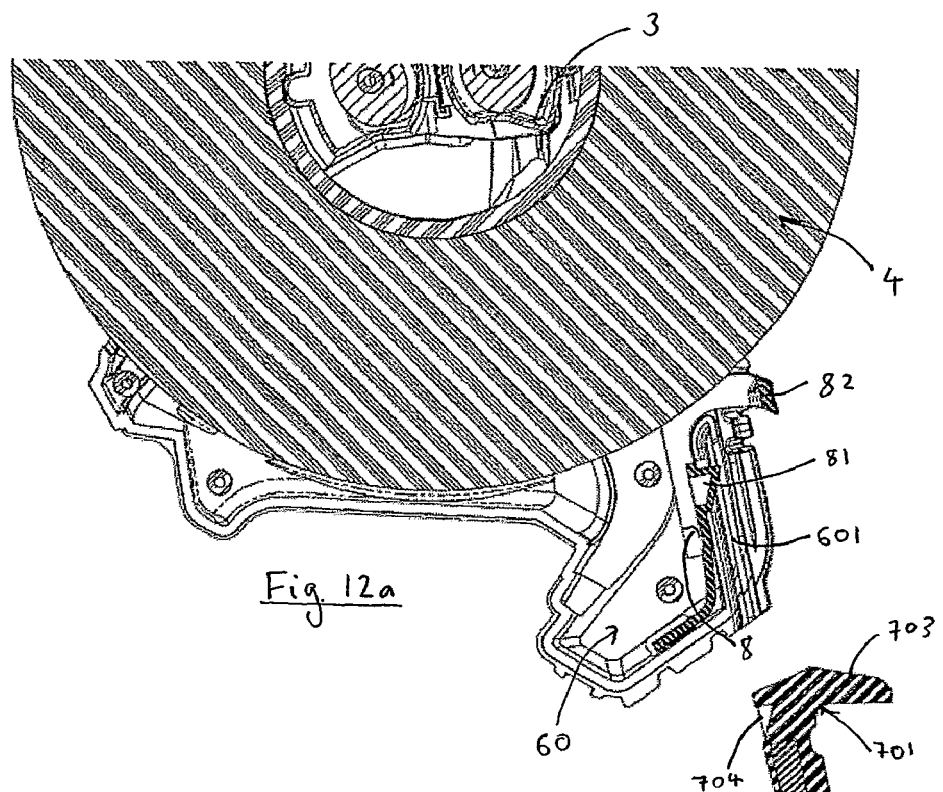
Figure 12B:
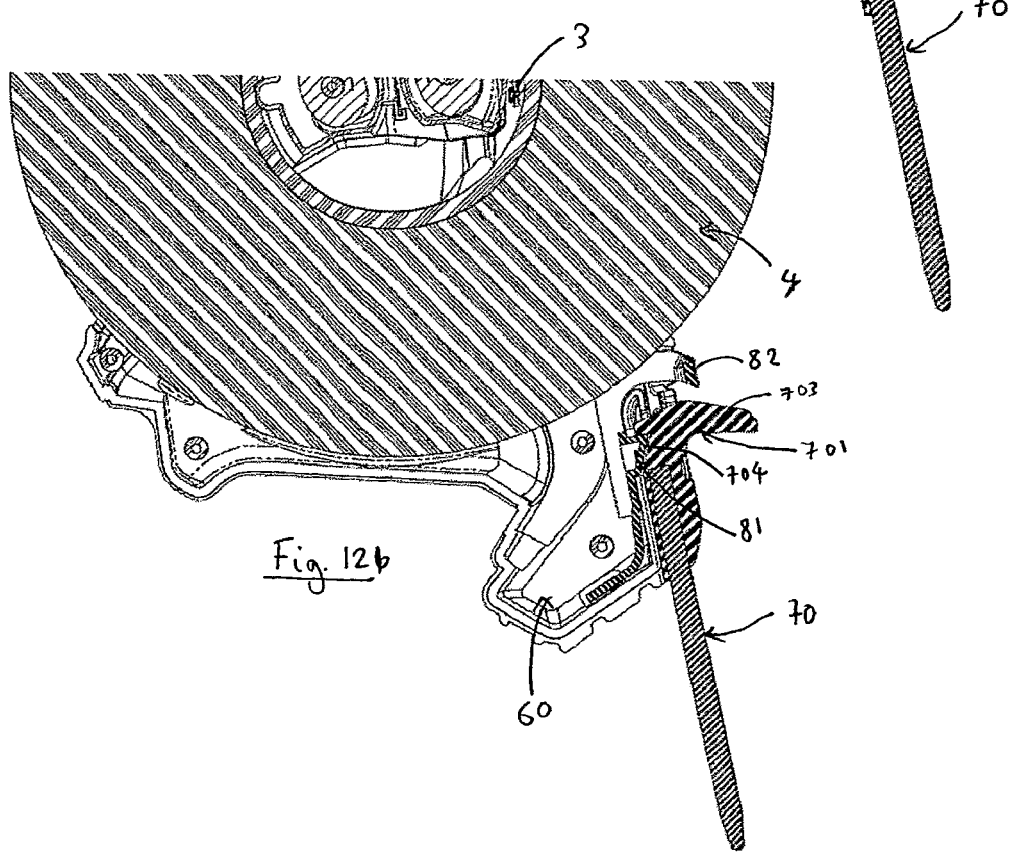

FIGS. 10a and 10b are sectional views of the upper half of the tape measure of FIGS. 9a and 9b FIGS. 11a and 11b are oblique views of the tape measure in accordance with the second embodiment of the present invention that illustrate how the ground engaging spike, described below, is mounted for use;

FIGS. 12a and 12b are sectional views of the lower half of the tape measure of FIGS. 11a and 11b;

FIG. 13a is an oblique view of a ground engaging spike and measuring tape with loop, of the tape measure of the second embodiment; and FIG. 13b is a side view of the ground engaging spike and loop of FIG. 13b connected together.

Figure 1:
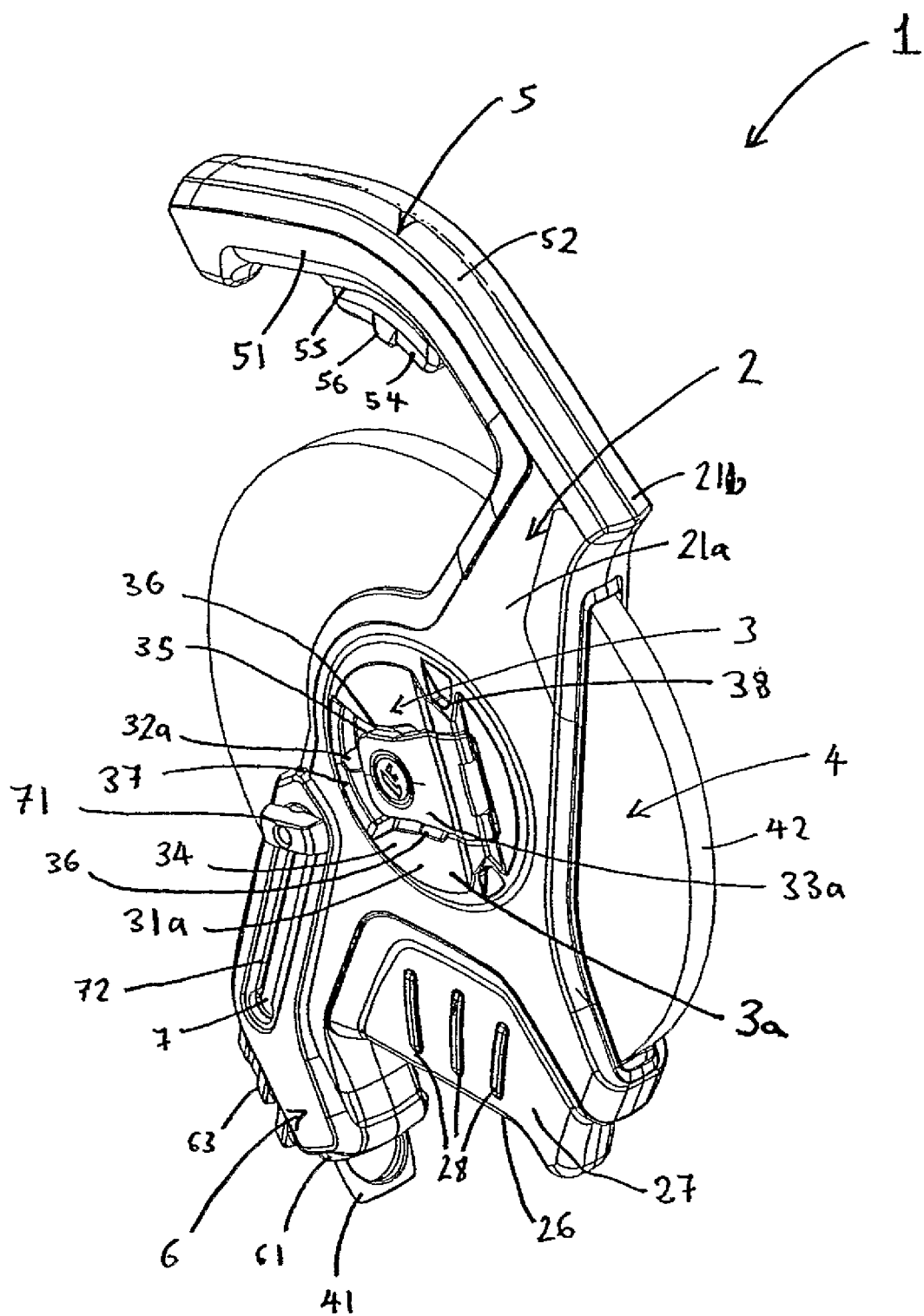
FIG. 1 is an oblique view of a tape measure in accordance with a first embodiment of the present invention.
Figure 2:
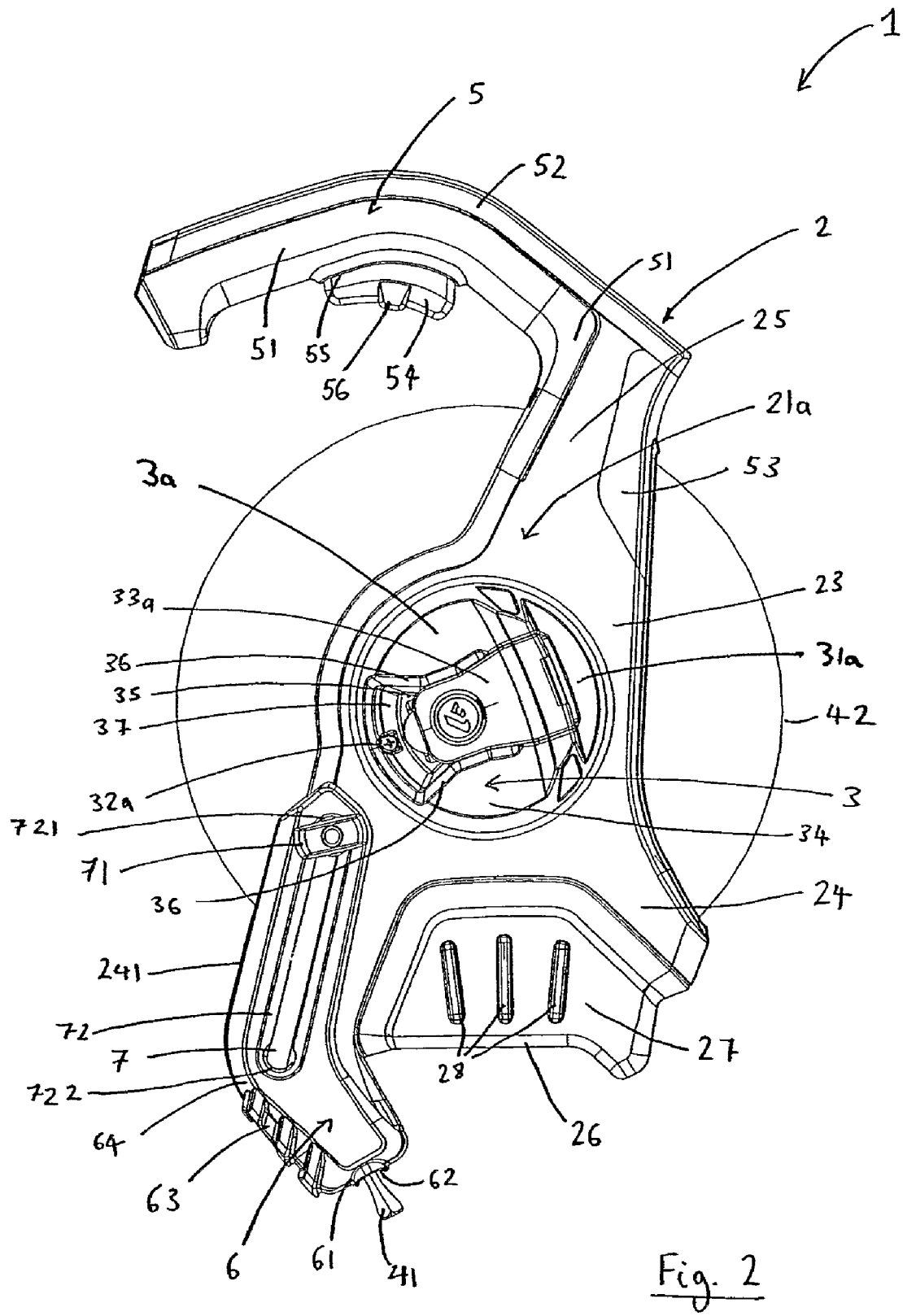
FIG. 2 is a side view from one side of the tape measure of FIG. 1.
Figure 3:
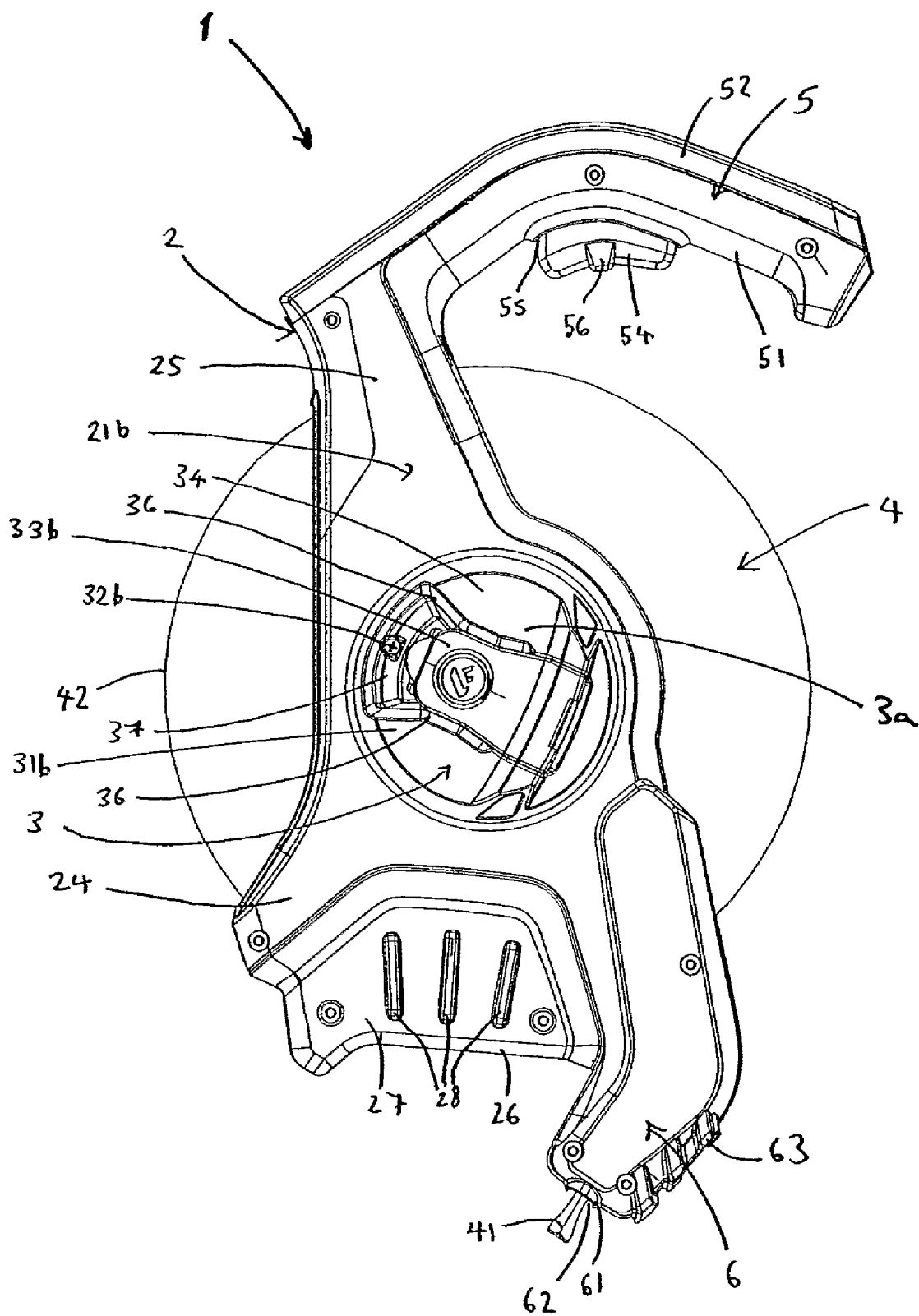
FIG. 3 is a side view from the other side of the tape measure of FIG. 1.
Figure 4:
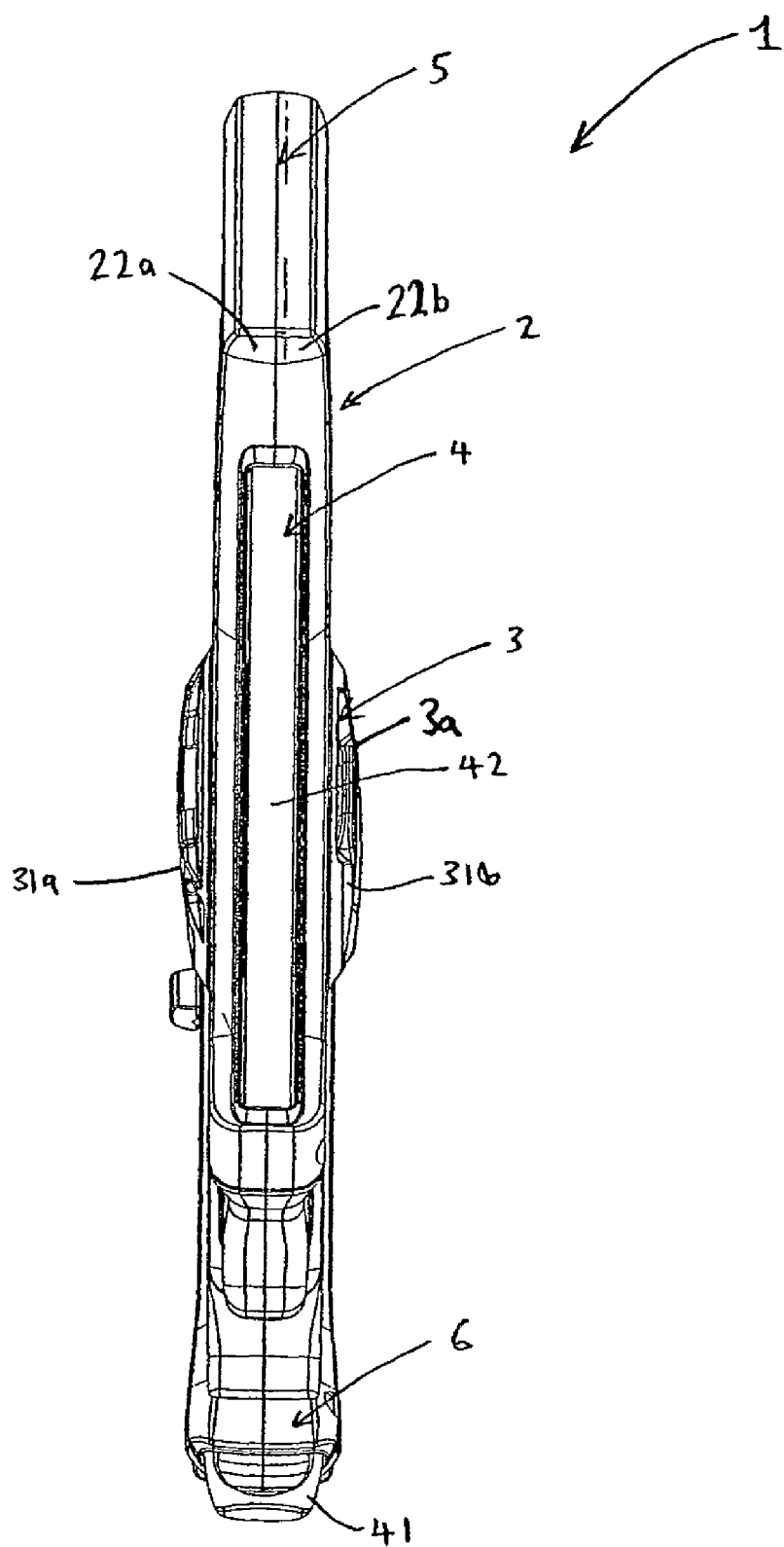
FIG. 4 is a front view of the tape measure of FIG. 1.
Figure 5:
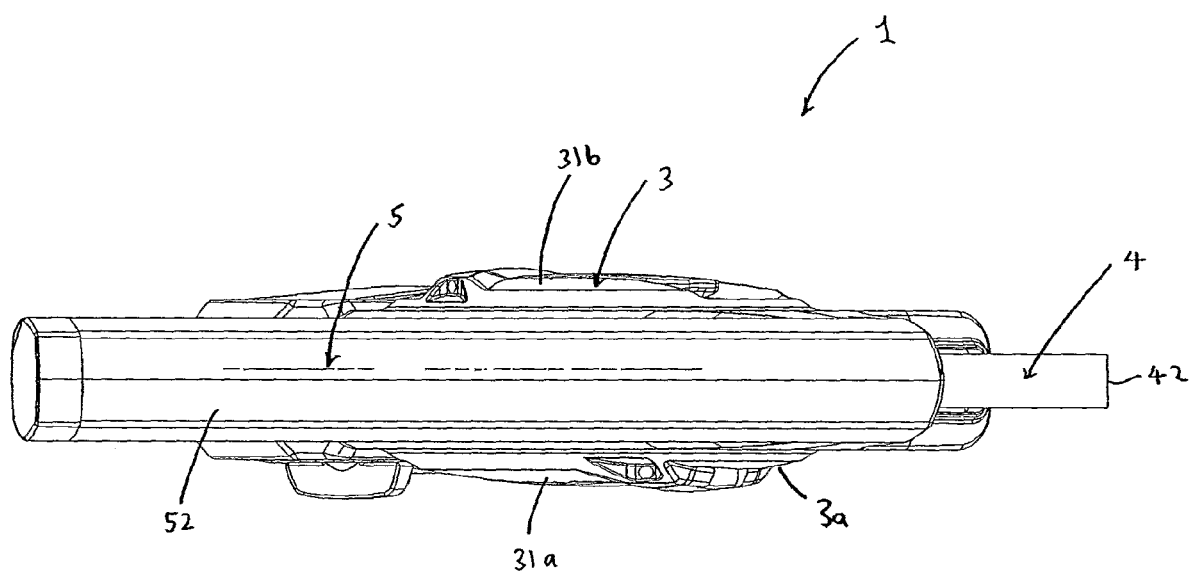
FIG. 5 is a top plan view of the tape measure of FIG. 1.
Figure 6:
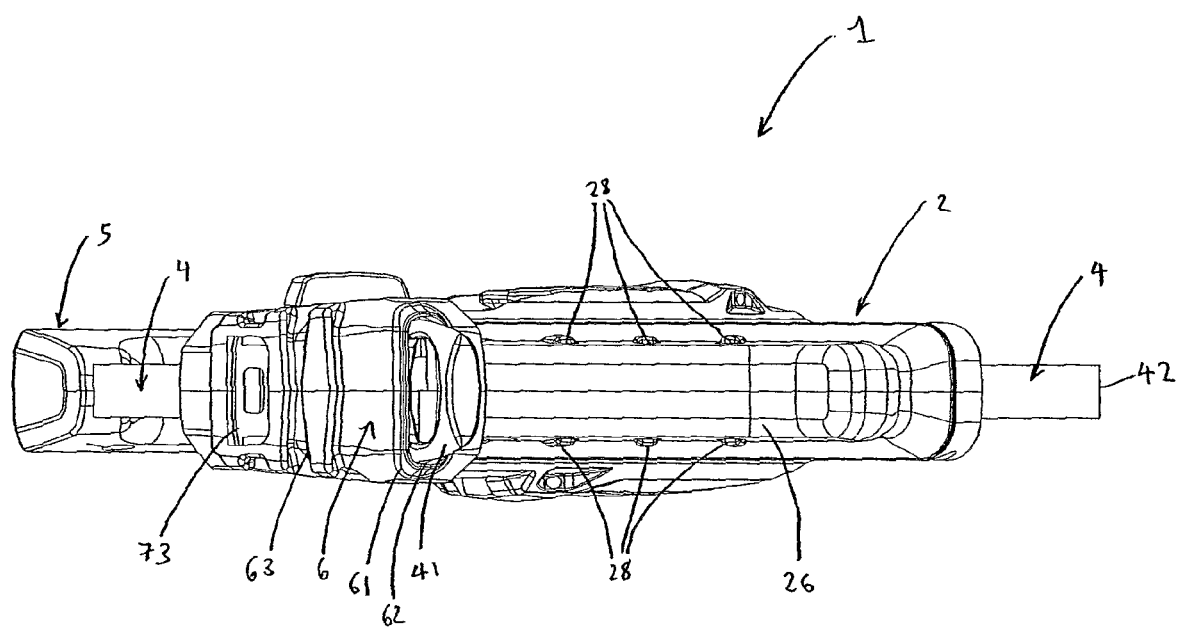
FIG. 6 is a bottom plan view of the tape measure of FIG. 1.
Figure 7:
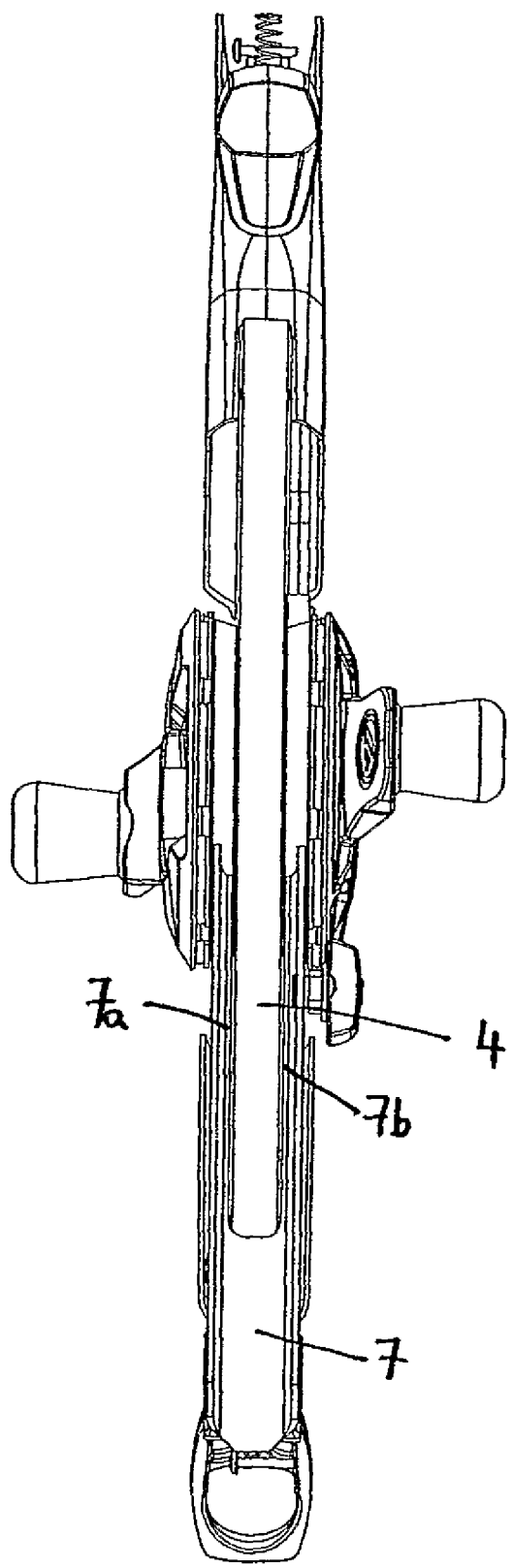
FIG. 7 is a rear view of the tape measure of FIG. 1 with the components of a frame part removed to more clearly show the form of a ground engaging spike housed within the frame.

A tape measure in accordance with a first embodiment of the present invention is shown in FIGS. 1 to 8d. The tape measure 1 comprises a frame 2 made from a pair of injection moulded half shells 21a, 21b, lateral projections 22a, 22b of the shells abutting one another at the top and bottom of the frame, as best seen in FIG. 4. The shells 21a, 21b are joined to one another by screws and/or other appropriate joining methods such as sonic welding or interlocking 'click-fit' features.

A winding assembly 3, on which a measuring tape 4 is wound, is rotatably mounted in a centre portion of the frame 2. The winding assembly comprises a centre moulding 3a and a drum (not shown) fixed to rotate with the centre moulding 3a. The drum and the centre moulding 3a may be formed as a single moulding or formed as separate components that are subsequently assembled. The centre moulding 3a itself may be formed in more than one piece.

One end of a measuring tape 4 is attached to the winding assembly 3 either directly or by means of a flexible joining strip or 'leader', and the tape coils up around the outer surface of the drum within the frame 2.

The measuring tape 4 may be made of material conventionally used for long tapes, such as steel or glass-reinforced fibre, and has a hook or loop 41 at its free end that can be used to fix that end to the ground or other reference position.

In this example, the centre moulding 3a of the winding assembly 3 comprises two parts 31a, 31b that screw together through large holes in side walls of the frame half shells 21a, 21b. Annular bearing surfaces abut the outer of the frame side walls around the centre holes thereby retaining the winding assembly 3 axially within the frame 2.

Two winding handles 33a, 33b are mounted on the winding assembly 3, one to each side. The opposite sides of the centre moulding 3a each have a slightly domed surface 34 with a channel 35 bounded by parallel side walls 36 extending diametrically across the domed surface 34. A lip 37 with a concave inner wall closes one end of the channel 35. A pin 38 runs perpendicularly between the two channel side walls 36 near, but spaced from, the opposite end of the channel. One end of the winding handle 33a, 33b is hinged on this pin 38.

When either winding handle 33a, 33b is not in use it can lie within the channel 35 with its upper surface generally flush with the domed surface 34 of the drum. When it is required to wind in the tape 4, one of the handles 33a, 33b is turned outwards around the hinge pin 38 to extend outwardly from the winding assembly 3, exposing a winding knob rotatable on a spindle projecting from the handle 33a, 33b. When the handle 33a, 33b is not in use this spindle and winding knob fit into a recess in the surface of the centre moulding 3a.

Each of the two frame half shells 21a, 21b, which are mirror images of one another, have side wall portions 23 that are generally triangular in shape (see FIGS. 2 and 3), tapering from a relatively broad base 24 that encloses about 90 degrees of the circumferential extent of the spooled tape to a narrower top 25 that extends around about 20 degrees of the circumferential extent of the tape. The triangular side walls 23 of the housing are skewed slightly towards the front edge 42 of the tape measure 4 with the top 25 of the 'triangle' being diametrically opposed to the rear end 241 of the base 24 of the 'triangle'.

The frame has a pistol grip handle 5 that protrudes rearwardly from the top 25 of the triangular side walls 23, above the coiled tape 4. The handle 5 is curved in the plane of the coiled tape 4 to generally follow the perimeter of the coiled tape 4 but is spaced sufficiently from it to allow a person to grasp the handle 5 with clearance between the tape coil and their knuckles even when the tape 4 is fully rewound (as seen in the figures).

A first grip insert 51 wraps around the underside and the rear end of the handle 5, extending partly up each side of the handle 5 and down onto the rear edges of the top 25 of the frame side walls 23. It sits within a recess in this example to lie flush with the sides 52 of the handle above the grip and the frame side walls 23. A second grip insert 53 is provided wrapping around the front end of the handle 5 and the front edges of the top ends 25 of the frame side walls 23. This grip 53 is also sat in a recess to lie flush with the surface of the frame 2.

A further grip element (not shown) may be provided on the top of the handle 5 to rest against a user's chest or upper arm when the tape measure is grasped by the lower grip in the manner discussed below.

Mounted in an aperture 55 on the underside of the handle 5 there is a trigger 54 that can be squeezed with one or more fingers when the handle 5 is grasped. As the trigger 54 is squeezed it moves from an initial position to a depressed position in which it causes a brake to engage the winding assembly 3 to resist and, if the trigger is sufficiently depressed, to stop its rotation. The trigger 54 is connected by a linkage that runs along the inner wall of one or both of the frame half shells 21a, 21b to a brake mechanism associated with the winding assembly 3. The trigger 54 is resiliently urged toward its initial position, so that the drum brake is released when the trigger 54 is released.

The trigger actuated brake can conveniently be used with one hand (the hand holding the tape measure 1) to lock the winding assembly 3 so that the tape 4 can be pulled taught when a measurement is to be taken (with the other end of the tape being fixed to the ground or held in some other way).

The trigger 54 may have a lock associated with it to retain the trigger in a depressed state (in which it brakes the winding assembly 3). For instance, the trigger 54 mechanism may include an interlock element that engages the trigger 54 or the associated linkage when it is depressed to lock the trigger 54 in this position. Alternatively, the trigger 54 itself may include a locking formation (e.g. a step or a projection 56) that through appropriate manipulation of the trigger 54 can be brought into engagement with the inside edge of the aperture 55 in the handle in which it is mounted to prevent the trigger 54 returning to its initial position.

At the rear end of the base 24 of the frame member 2 there is an elongate snout portion 6 that protrudes downwardly beyond the coiled tape 4 and is angled forward, in this example at about 45 degrees to the vertical (as seen in FIGS. 2 & 3). The snout 6 terminates in a mouth 61 that includes a slot 62 through which the tape 4 is drawn off the coil. A series of guide elements within the snout 6 define a path for the tape to follow from the periphery of the tape coil to the mouth 61 of the snout 6. In use, the tape is drawn out through the slot 62 in the snout manually (e.g. by grasping the tape a pulling it through the slot or by fixing the free end of the tape and then walking the tape measure away from the fixed free end of the tape) and rewound back through the snout 6 using one of the winding handles 33a, 33b in the manner described above.

The configuration of the handle 5 and the snout 6, with the handle 5 and snout 6 both being offset to one side of the winding drum 3, provides a very balanced arrangement that naturally hangs in the orientation seen in the figures when the handle 5 is grasped in one hand. With the hook or loop 41 at the free end of the tape 4 fixed to the ground, the tape 4 can be drawn out by walking the tape measure 1 away from the fixed free end holding the handle 5 with a comfortable grip. The forward inclination of the snout 6 (which therefore points towards the line of the deployed tape allows the tape 4 to be drawn off the coil with the minimum of resistance as, even when the snout 6 is held close to the ground, the tape 4 does not have to take a sharp turn as it exits the mouth 61.

Conveniently, the tape 4 can be cleaned as it is retracted by grasping the snout 6 in the palm of one hand with the thumb and one or two fingers holding a cloth around the tape 4 adjacent the mouth 61 of the snout 6 so that the tape 4 is drawn through the cloth as it is rewound onto the winding drum 3. A grip element 63 is provided on the snout.

The tape measure 1 includes a further grip formation 26 at the base 24 of the triangular side walls 23 of the frame 2. This lower grip 26 is diametrically opposed to the pistol grip handle 5, forward of the snout 6. The lower grip 26 extends along a sufficient length of the base 24 of the frame for it to be comfortably grasped with the whole hand, with the palm on the grip on one side of the frame 2 and the fingers wrapping around the underside of the frame 2 to the grip on the other side of the frame 2.

The lower grip formation 26 includes a recess that extends along the underside of the base 24 of the frame 2 and wraps up onto both side walls of the frame 2. A grip element 27, for example a rubber insert or over-moulding, is located in the recess and has a series of ribs 28 to improve the grip even when the tape measure 1 is wet.

Conveniently, the lower grip 26 can be used to hold the tape measure 1 as the tape is rewound. Whilst grasping this lower grip 26 with one hand the user can press the pistol grip handle 5 into their body or upper arm to stabilise the tape measure 1 whilst operating one of the winding handles 33a, 33b with the other hand.

An adjustable spike 7 is housed within the frame 2 at the rear end of the base 24 of the frame member 2. It is mounted on the frame 2 to be displaceable between a fully retracted position (seen in the figures), in which a lower end of the spike 7 is retracted within the frame 2, and an extended position in which the lower end of the spike 7 protrudes beyond the bottom of the snout 6.

In the retracted position, the spike 7 extends from a position near, but off set from, the winding assembly 3, toward a position adjacent the rear end 64 of the snout 6. The upper end of the spike 7 has a fork shape (seen in FIG. 7, which is a rear view of the tape measure with parts of the frame removed to show the full extent of the spike 7). The two arms 7a, 7b of the upper end of the spike 7 extend one to either side of the coiled tape 4 so that the spike 7 straddles the tape 4.

Figure 8A:
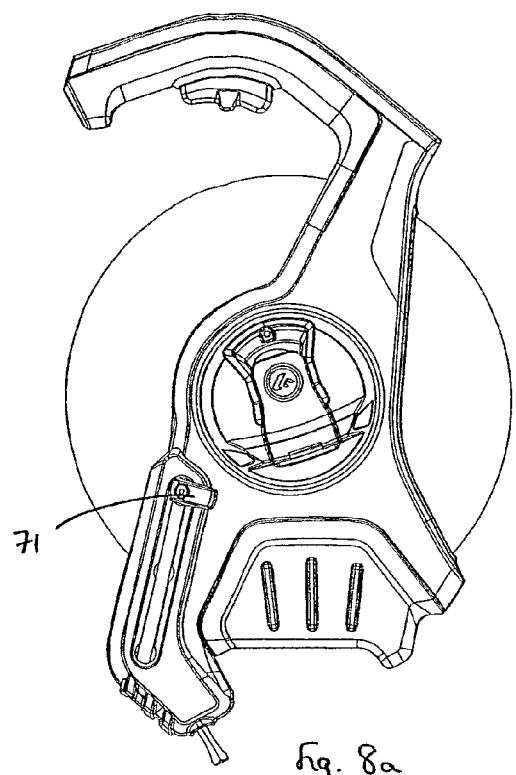
FIGS. 8a, 8b, 8c and 8d are side views of the tape measure of FIG. 1 to illustrate operation of a ground engaging spike described below.
Figure 8B:
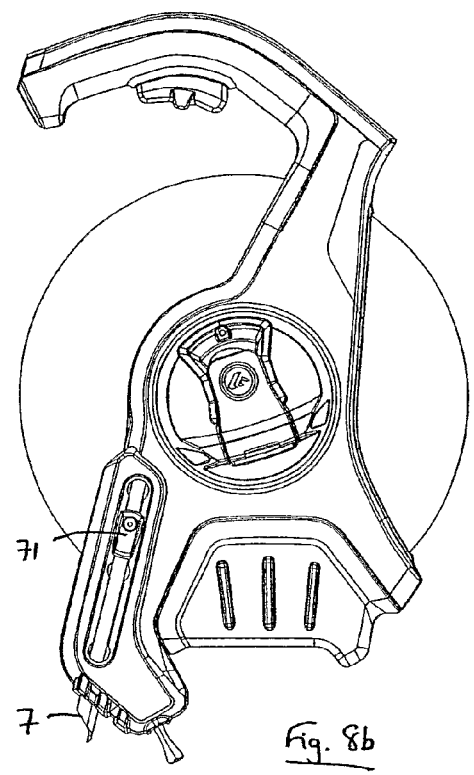
Figure 8C:
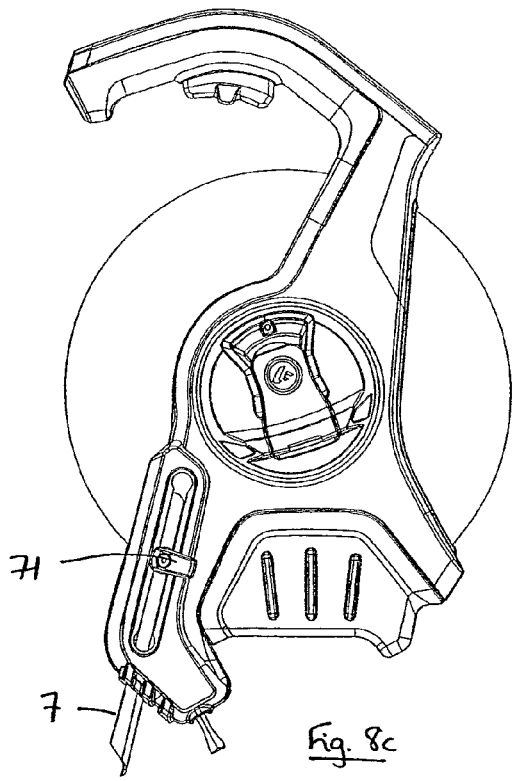
Figure 8D:
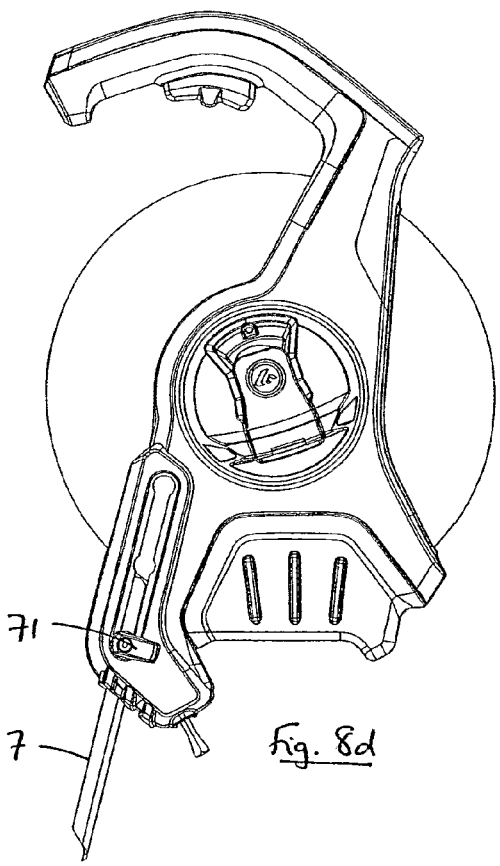

A locking knob 71 is attached to one side of the spike 7 and can be used to lock the spike in any of the retracted position (as seen in FIG. 8a), a fully extended position (FIG. 8d) and an intermediate position (FIG. 8c) between these two extremes. In the intermediate position the spike 7 extends to bring its bottom end generally into line with the bottom surface of the snout 6, allowing the snout and the spike to both rest on the ground to more surely locate the tape measure when a measurement is being taken (or to allow the spike to rest on the ground with the snout close to the ground, depending on how the user holds the tape measure). In the fully extended position the lower end of the spike 7 extends beyond the bottom surface of the snout 6. In this configuration, the spike 7 can be imbedded in the ground to fix the position of the tape measure and even to support the tape measure (without the need for the operator to hold it) whilst measurements are being taken or distances measured out. This may be useful, for instance, when marking out a series of pitches along a line (as you might do on a building site or sports pitch for example), both ends of the tape be fixed to hold the tape taught whilst the pitches are marked off.

The locking knob 71 protrudes through a slot 72 in the side wall 23 of the half shell 21a of the frame 2. The slot 72 is angled in the same direction as the longitudinal axis of the spike 7 and defines a path along which the knob 71 (and hence the upper end of the spike 7 to which it is attached) can travel when the knob 71 is unlocked to release the spike 7 for movement In particular, the knob 71 can travel from a position adjacent the top 721 of the slot 2, where the spike is fully retracted within the frame 2, to toward the bottom 722 of the slot 2, where the spike 7 projects from a hole 73 positioned on the underside of the base 24 of the frame 2 (see FIG. 6).

Any of a number of suitable mechanisms may be used to lock the knob 71 in position relative to the slot 72 in which it slides. For instance, the portion of the knob 71 extending through the slot 72 can be shaped in cross-section such that in a first orientation it is free to move along the slot 72 but in a second orientation (e.g. turned through a predefined angle, e.g. 90 degrees-see FIG. 8b) it binds against the sides of the slot or engages with a formation (e.g. recess) on one or both sides of the slot. For example, the portion of the knob 71 extending through the slot 72 may have a cam-shape cross-section, end portions of which can engage recesses in the sides of the slot 72.

As an alternative, the locking knob 71 could be attached to a threaded spigot extending from the spike 7 through the slot so that the knob 71 can be tightened against the outside face of the half shell 21a adjacent the sides of the slot 72 by screwing it down onto the threaded spigot, locking the spike 7 in place.

The locking arrangement for the spike 7 may be adapted to enable the spike 7 to be locked only in one of a number of predetermined positions (e.g. only in the retracted, fully extended and intermediate positions referred to above). Alternatively, it may be adapted to enable the spike 7 to be locked in any position between the two extremes.

A tape measure 10 in accordance with a second embodiment of the present invention is shown in FIGS. 9a to 12b. Features of the tape measure 10 of the second embodiment, that are similar or identical in appearance and function to features of the tape measure 1 of the first embodiment, have been given the same reference numerals for simplicity, and are not described in detail again.

The primary differences between the tape measures 1, 10 of the first and second embodiments are with respect to the spike. The spike 70 of tape measure 10 of the second embodiment is a removable spike 70. The removable spike 70 can be moved between a storage position, in the grip handle 50, and a use position, where it is mounted adjacent the elongate snout portion 60 of the frame member 2.

In more detail, when not in use, the removable spike 70 can be stored in a cavity 501 provided in the grip handle 50. In FIG. 9a, the removable spike 70 is shown prior to entry into the cavity 501. The removable spike 70 has a grip 701 at one end. Extensions 702 are provided on either side of the grip 701. To locate in the cavity 501 (as shown in FIG. 9b), the spike is pushed into the cavity 501, using the grip 701, in the direction along the longitudinal axis of the spike. The removable spike 70 is pushed into the cavity 501 via an opening 502 at the distal end of the grip handle 50.

FIGS. 10a and 10b show cross-sectional views of the upper side of the tape measure 10 before and after location of the removable spike 70 in the cavity 501 respectively. A channel 503 is provided adjacent the opening 502 of the cavity 501. The channel 503 is configured to guide the extensions 702 of the grip 701 such that the removable spike 70 is oriented in an appropriate direction when it is pushed into the cavity 501. Furthermore, when the removable spike 70 is fully located in the cavity 501, the channel 503 holds the removable spike 70 firmly in position in the cavity 501. (The removable spike 70 is fully located in the cavity 501 when its grip 701 abuts against the rim 504 of the opening 502 of the cavity 50.)

So that the removable spike 70 can be removed from the cavity 501, a projecting flange portion 703 of the grip 701 is provided that can be engaged and pulled along the longitudinal axis of the removable spike 70 away from the opening 502 of the cavity.

In FIG. 11a, the removable spike 70 is shown prior to mounting in a position for use. To mount the spike 70 in the position for use, the grip 701 of the removable spike 70 is pushed into a slot 601 of the frame 2, adjacent the snout portion 60 of the frame member 2 (see FIG. 11b). The slot 601 is configured to guide the extensions 702 of the grip 701 as the grip 701 is pushed into the slot 601. The grip 701 is pushed into the slot 601 in the direction along its longitudinal axis of the removable spike 70.

FIGS. 12a and 12b show cross-sectional views of the lower side of the tape measure 10 before and after location of the grip 701 in the slot 601 respectively.

The removable spike 70 is locked in position for use using a lock mechanism 8. The lock mechanism 8 comprises a catch 81, which clips into a recess 704 of the grip 701 when the grip 701 is fully located within the slot 601. To release the removable spike 70 from the slot 601, a push button 82 is provided that can be actuated to withdraw the catch 81 from the recess 704, allowing the grip 701 to be slid out of the slot 601.

The removable spike 70 may be used to fix the tape measure 10 to the ground when mounted in the slot 601 (as described above with respect to the first embodiment). The removable spike 70 has a circular cross-section in a plane perpendicular to the longitudinal axis of the spike. This circular cross-section may permit the tape measure 10 to rotate when the tape measure 10 is fixed to the ground via the removable spike 70 if the removable spike is embedded in the ground in a direction substantially perpendicular to the ground surface (a substantially vertical/upright direction when the ground surface is level). This may be particularly useful e.g. if the tape measure 10 is to be used to mark out a circle on the ground. However, for standard measuring use, the removable spike 70 is embedded into the ground at an angle (e.g. 20-30 degrees from a direction perpendicular to the ground surface), such that measuring tape 4 projects from the snout 60 opening in a direction generally parallel with the ground. By embedding into the ground at an angle, rotation of the tape measure is inhibited.

Since the removable spike 70 can be removed from the tape measure frame 2, it may be used to pin the loop 401 of the free end of the measuring tape 4 (see FIG. 13a) to the ground, e.g. whilst distances are being measured out. As shown in FIG. 13b, the removable spike 70 is connectable (via the grip 701 in this instance) to the loop 401, such that the longitudinal axis of the removable spike 70 aligns with the "zero-position" of the loop 401/measuring tape 4, i.e. the position from which the distance scales of the tape measure 10 are measured. Thus, accurate measurements of the distance from the point at which the removable spike 70 embeds into the ground can be made using the tape measure 10. A secure connection between the grip 701 of the removable spike 70 and the loop 401 is effected using complementary openings/recesses 402, 705 of the loop 401 and grip 701.

The invention claimed is:

1. A tape measure having a winding drum rotatably mounted on a support structure, a measuring tape attached to the drum so as to be coilable thereon, the measuring tape having a free end, and an elongate spike removably mounted on the support structure to protrude beyond the perimeter of the coiled measuring tape, wherein the elongated spike configured and arranged such that it can be removed from the support structure and connected to the free end of the measuring tape.

2. A tape measure according to claim 1, wherein the support structure comprises a housing within which the elongate spike can be stored.

3. A tape measure according to claim 1, wherein the elongate spike can be retracted fully within the support structure.

4. A tape measure according to claim 1, wherein the support structure is a casing.

5. A tape measure according to claim 1, wherein the tape measure is a long tape and comprises one or more winding handles for retracting the tape.

6. A tape measure having a winding drum rotatably mounted on a support structure, a measuring tape attached to the drum so as to be coilable thereon, and an elongate spike removably mounted on the support structure to protrude beyond the perimeter of the coiled measuring tape, wherein the support structure comprises a housing within which the elongate spike can be stored, the tape measure comprising a grip handle, wherein the housing for storing the elongate spike is within the grip handle, wherein the grip handle is spaced sufficiently from the coiled measuring tape to allow a person to grasp the handle with clearance between the tape coil and knuckles of a user.

7. A tape measure according to claim 6, wherein the tape measure is a long tape and comprises one or more winding handles for retracting the tape.

* * * * *